United States Patent [19]
Okamoto et al.

[11] Patent Number: 5,173,962
[45] Date of Patent: Dec. 22, 1992

[54] OPTICAL WAVELENGTH CONVERSION DEVICE WITH HIGH ALIGNMENT ACCURACY

[75] Inventors: Sota Okamoto; Kiyofumi Chikuma, both of Tsurugashima, Japan

[73] Assignee: Pioneer Electronic Corporation, Tokyo, Japan

[21] Appl. No.: 790,526

[22] Filed: Nov. 12, 1991

[30] Foreign Application Priority Data

Apr. 18, 1991 [JP] Japan ............................. 3-86777

[51] Int. Cl.$^5$ .......................... G02B 6/02; G02B 6/16
[52] U.S. Cl. ................................. 385/122; 359/326
[58] Field of Search .............................. 359/326–332; 385/122

[56] References Cited

U.S. PATENT DOCUMENTS 4,909,595  3/1990  Okazaki et al. ................ 385/122
4,962,993  10/1990  Okamoto et al. ............... 385/122 X
5,097,527  3/1992  Kubata et al. .................. 359/328

FOREIGN PATENT DOCUMENTS 0418916  3/1991  European Pat. Off. ............ 385/122

Primary Examiner—Akm E. Ullah
Attorney, Agent, or Firm—Foley & Lardner

[57] ABSTRACT

The optical wavelength conversion device according to the present invention comprises a light source for emitting a fundamental wave, a waveguide type optical wavelength conversion element having an optical coupler to receive said fundamental wave and an optical waveguide made of non-linear optical material for converting the fundamental wave to a secondary harmonic, and a light-focused optical system having an objective lens for converging the fundamental wave to the optical coupler, wherein the light-focused optical system includes an optical tilting means for tilting the optical axis of the fundamental wave with respect to the optical axis of the objective lens. The wavelength conversion device having a simple arrangement of an optical system can guide the fundamental wave to the wavelength conversion element at a high accuracy.

7 Claims, 3 Drawing Sheets

OPTICAL WAVELENGTH CONVERSION DEVICE WITH HIGH ALIGNMENT ACCURACY

BACKGROUND OF THE INVENTION

1. Field of the Invention

The present invention relates to an optical wavelength conversion device.

2. Description of the Prior Art

There is an optical wavelength conversion device having an essential structure as shown in FIG. 1. The wavelength conversion device comprises a semiconductor laser 1 and a wavelength conversion element 5 of optical fiber type. The semiconductor laser 1 is used as a light source generating a fundamental wave. The optical wavelength conversion element 5 has a core 3 made of nonlinear optical material and a clad 4 surrounding it. The wavelength conversion element is used as a waveguide type wavelength conversion element for converting the fundamental wave having a wavelength to the secondary harmonic having a half wavelength of the fundamental wave. This optical wavelength conversion device further has a condenser lens disposed between the semiconductor laser 1 and the wavelength conversion element 5 which is employed for converging the fundamental wave emitted from the semiconductor laser 1 to an optical coupling portion i.e. a circular end surface(core end surface) of the core 3.

It is necessary to efficiently couple the fundamental wave to the optical coupling portion of the core end surface in order to convert the fundamental wave to the secondary harmonic with a high efficiency in the optical wavelength conversion device. For this purpose, a focused spot of the fundamental wave emitted from the semiconductor laser 1 should be accurately aligned with the core end surface receiving the focused spot in the three dimension, i.e. X and Y directions on the core end surface and in Z direction of a standard optical axis of the core. Here, the direction of the standard optical axis is Z direction in the rectangular XYZ coordinate system as shown in FIG. 1.

In this case, the adjustment accuracy in the Z direction is determined by the focal depth of the condenser lens 2, and an error of about ±1 μm is allowed.

However, the relative position between the focused spot of the fundamental wave and the core end surface receiving the focused spot should be adjusted with a fine accuracy at a submicron order during the aligning operation of the X and Y directions on the core end surface, because the diameter of the core 3 is about 1 μm.

It will be presumed that the optical wavelength conversion element 5 and/or the condenser lens 2 are mounted on a fine-movement stage of an adjusting mechanism so as to perform a fine adjustment between the fundamental wave and the core end surface in X and Y directions with a high accuracy.

However, it is difficult to satisfactorily achieve such a high-accuracy adjustment. Further, the fine adjustment as described above leads to a complicated adjusting mechanism, and this hinders the preparation of a small-size optical wavelength conversion device. This further results in inconveniences for mass production and cost reduction.

SUMMARY OF THE INVENTION

An object of the present invention is to provide an optical wavelength conversion device with a simple arrangement and an optical system, which can guide a laser beam toward an optical wavelength conversion element at high accuracy.

The optical wavelength conversion device according to the present invention comprises: a light source for emitting a fundamental wave; a waveguide type optical wavelength conversion element having an optical coupler for receiving said fundamental wave and provided with an optical waveguide made of a non-linear optical material for producing a secondary harmonic on the basis of the wavelength of said fundamental wave; and a light-focused optical system having an objective lens for converging said fundamental wave to said optical coupler. This optical wavelength conversion device is characterized in that said light-focused optical system is furnished with an optical tilting means for tilting the optical axis of said fundamental wave with respect to the optical axis of said objective lens.

It is possible according to the present invention to introduce the laser beam into the optical waveguide at a high accuracy by adjusting the position of the light source.

DETAILED DESCRIPTION OF PREFERRED EMBODIMENTS

The embodiments according to the present invention will be described in more detail with reference to the drawings.

Figure 1:
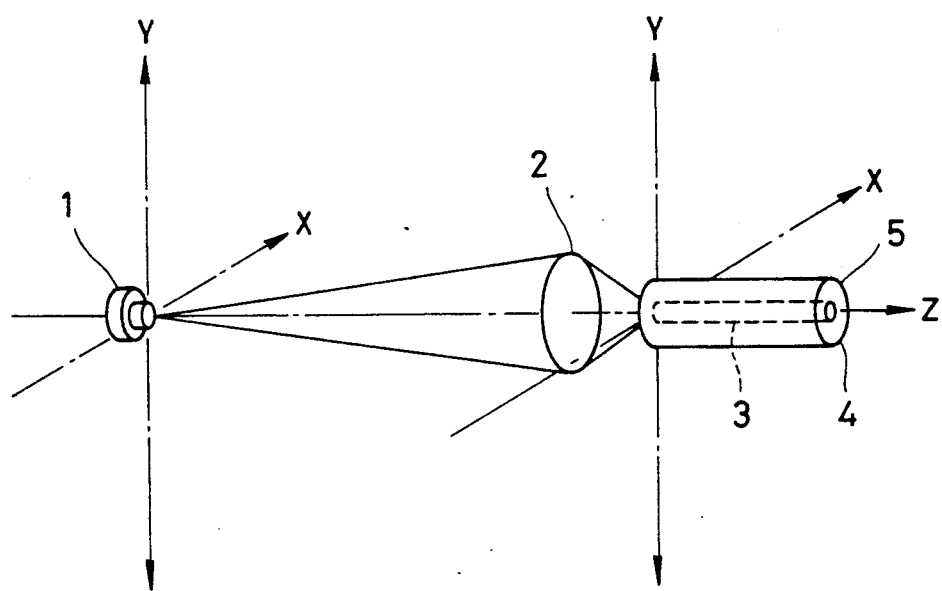
FIG. 1 is a drawing for explaining the essential part of a conventional optical wavelength conversion device.
Figure 2:
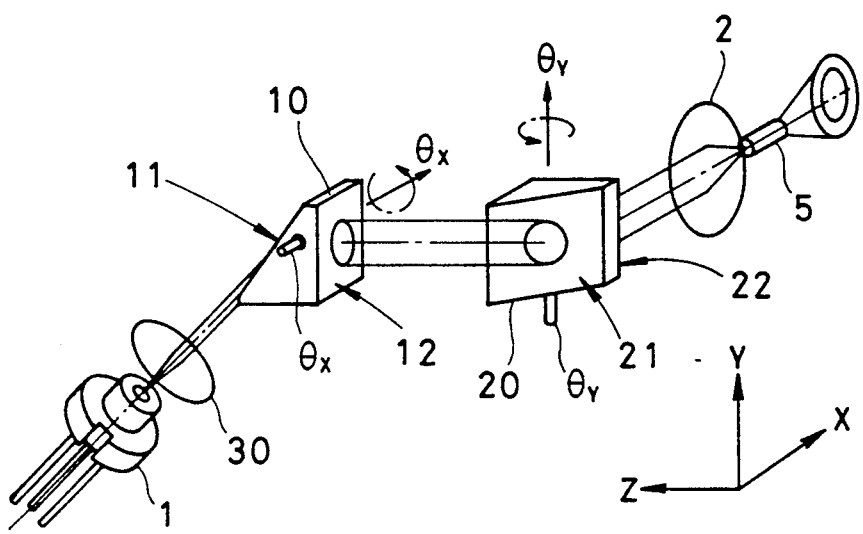
FIG. 2 is a perspective view for explaining the essential part of a freely rotatable deflection prism in an optical wavelength conversion device of an embodiment according to the present invention.

FIG. 2 shows the essential part of an optical wavelength conversion device according to the present embodiment. The optical wavelength conversion element 5 is an optical fiber type, comprising a core made of nonlinear optical material and a clad enclosing it. A semiconductor laser 1 generates a fundamental wave. A collimator lens 30 converts the emanating light of the fundamental wave to a parallel light beam. A first triangular deflection prism 10 receives this parallel light beam at its incoming plane 11 and transmits the light beam through its outgoing plane 12 to a second triangular deflection prism 20 while tilting the optical axis of the light beam at a certain angle. Similarly, the second deflection prism 20 transmits the light beam through its incoming plane 21 and its outgoing plane 22 to an objective lens 2 while tilting the optical axis of the light beam at a certain angle. The objective lens 2 receives the light beam and converges it to the core end surface of the optical wavelength conversion element 5. The first and the second deflection prisms 10 and 20 are freely rotatable with respect to the rotating axes $\theta_x$ and $\theta_y$ thereof, these rotating axes $\theta_x$ and $\theta_y$ of the both prisms cross almost perpendicularly to each other.

The fundamental wave can be converged to the optical coupler of the core end surface at a high accuracy by using the arrangement as described above, because the optical axis of the light beam emitted from the semiconductor laser 1 is tilted with respect to the optical axis of the objective lens 2.

Figure 3:
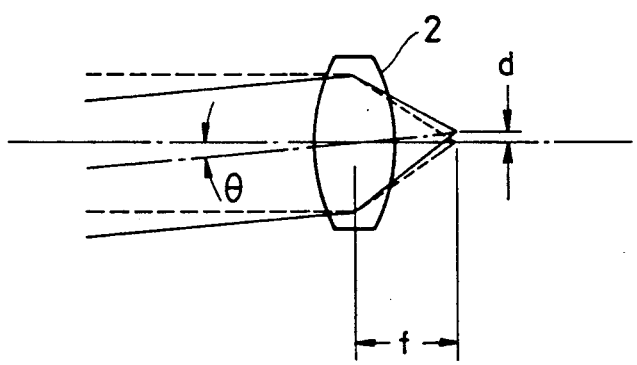
FIG. 3 is a drawing for explaining the operation of the objective lens of FIG. 2.

FIG. 3 shows the operating principle of the present embodiment. In the case that the incident angle of the light beam is changed, the light spot converged by the objective lens 2 is shifted from the optical axis of the objective lens by the following length d on the core end surface:

$$d = f \cdot \tan \theta$$

where f represents the focal length of the objective lens and $\theta$ represents the inclination formed by the both optical axes of the laser beam and the objective lens 2.

Figure 4:
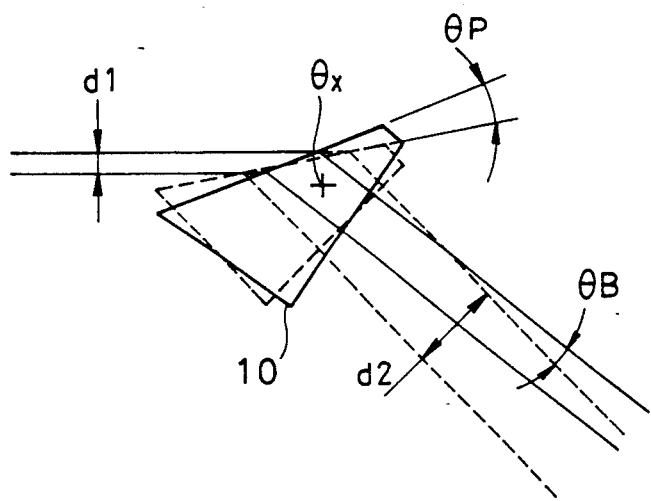
FIG. 4 is a drawing for explaining the operation of a first deflection prism of FIG. 2.

The relative adjustment between the focused spot of the fundamental wave and the core of the wavelength conversion element is performed on the basis of this principle. As shown in FIG. 2, the first and second deflection prisms 10 and 20 construct means for optically tilting or shifting the optical axis of the light beam to be converged into the core end surface. FIG. 4 shows that when the first deflection prism 10 is rotated around the rotating axis $\theta_x$, the optical axis of the outgoing light beam is tilted by $\theta B$ corresponding to the rotating angle $\theta P$ of the prism, and the position of the focused spot can be adjusted in Y direction within the core end surface.

Similarly, when the second deflection prism 20 is rotated around the rotating axis $\theta_y$, the position of the focused spot can be adjusted in Z direction within the core end surface. Therefore, the fine adjustment of the shifting spot on the core end surface can be achieved only by setting the rotating angles of the first and the second deflection prisms 10 and 20, because the finer the tilting angles of the optical axes of the light beam, the finer siftings of the light spot are finely adjusted with respect to the optical axis of the core or the objective lens.

Figure 5:
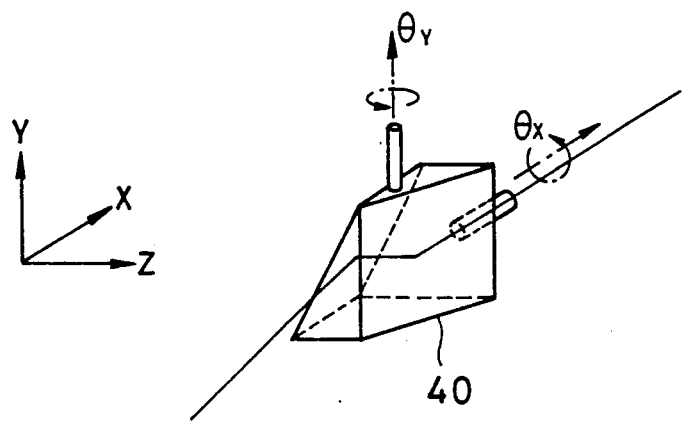
FIG. 5 is a perspective view of an integrated deflection prism of the optical wavelength conversion device of another embodiment according to the invention.

Further, the adjusting sensitivity of the light spot on the core end surface can be improved due to an increase of the rotating radius. This is because it is possible according to this method to adjust the position of the focused spot by adjustment of the rotating angle of the prisms. The optical axis tilting means is furnished as the first and the second deflection prisms 10 and 20 for the adjustment of the focused spot within the core end surface in Y and Z directions as shown in FIG. 2. The optical axis tilting means is also furnished as an integrated deflection prism 40 integrating a first and a second deflection prisms, as shown in FIG. 5. The integrated deflection prism 40 is be freely rotated around two axes $\theta_x$ and $\theta_y$ which cross perpendicularly to each other as described above.

The shape of the focused spot should be adapted to the shape of the core end surface in order to efficiently couple the outgoing light beam to the core end surface of the wavelength conversion element. For this purpose, it is necessary to modify the cross-sectional pattern of the fundamental wave. A beam shaping prism is used conventionally for the adaptation of the light beam. However, the deflection prisms shown in FIG. 2 or the integrated deflection prism shown in FIG. 5 can provide the same advantageous effect of the beam shaping prism.

For example, it is possible to improve the coupling efficiency of the fundamental wave connecting to the core so as to increase the efficiency of optical wavelength conversion in the conventional devices, when an oval cross-sectional beam emitted from the semiconductor laser is modified into a circular cross-sectional beam so as to adapt the core end surface of the wavelength conversion element having a core with a circular cross-section.

Therefore, in the above embodiment, it is possible to adjust the position of the focused spot on the core end surface at a high accuracy without requiring new component parts while serving the light beam shaping function, because the freely rotatable deflection prism can provide the effect of this beam shaping prism.

As another embodiment, the following arrangement may be adopted: for example, the first deflection prism 10 is fixed as a beam shaping prism, and a freely rotatable plane mirror may be provided around two axes $\theta_x$ and $\theta_y$ perpendicular to each other instead of the second deflection prism 20.

According to the present invention, it is possible to provide a small-size optical wavelength converter, which can adjust the position at a high accuracy when the laser beam is introduced to the optical wavelength conversion element by the simple arrangement with the freely rotatable deflection prisms.

What is claimed is:

1. An optical wavelength conversion device, comprising;
   a light source for emitting a fundamental wave,
   a waveguide type optical wavelength conversion element having an optical waveguide made of non-linear optical material for converting said fundamental wave to a secondary harmonic and an optical coupler for receiving said fundamental wave, and
   a light-focused optical system having an objective lens for converging said fundamental wave to said optical coupler, wherein said light-focused optical system is furnished with an optical tilting means for tilting the optical axis of said fundamental wave with respect to the optical axis of said objective lens, wherein said optical tilting means includes at least one deflection prism having a rotating mechanism, and the optical axis of the fundamental wave is tilted by rotating said deflection prism.

2. A device according to claim 1, wherein said deflection prism modifies the cross-section of the fundamental wave in its intensity distribution into the shape of said optical coupler.

3. A device according to claim 1, wherein said rotating mechanism has two rotating axes perpendicular to each other.

4. A device according to claim 1, wherein said light source is a semiconductor laser, and said waveguide type optical wavelength conversion element is a wavelength conversion element of an optical fiber type comprising a core made of non-linear optical material and a clad enclosing it.

5. A device according to claim 2, wherein said rotating mechanism has two rotating axes perpendicular to each other.

6. An optical wavelength conversion device, comprising;
   a light source for emitting a fundamental wave,
   a waveguide type optical wavelength conversion element having an optical waveguide made of non-linear optical material for converting said fundamental wave to a secondary harmonic and an optical coupler for receiving said fundamental wave, and a light-focused optical system having an objective lens for converging said fundamental wave to said optical couple, wherein said light-focused optical system is furnished with an optical tilting means for tilting the optical axis of said fundamental wave with respect to the optical axis of said objective lens wherein said optical tilting means is at least one plane mirror having a rotating mechanism and the optical axis of the fundamental wave can be tilted by rotating said plane mirror.

7. A device according to claim 6, wherein said rotating mechanism comprises two rotating axes perpendicular to each other.

* * * * *